United States Patent [19]

Nakamura

[11] Patent Number: 6,085,096
[45] Date of Patent: Jul. 4, 2000

[54] MOBILE COMMUNICATION SYSTEM

[75] Inventor: Noriyasu Nakamura, Tokyo, Japan

[73] Assignee: NEC Corporation, Tokyo, Japan

[21] Appl. No.: 08/925,656

[22] Filed: Sep. 9, 1997

[30] Foreign Application Priority Data

Sep. 13, 1996 [JP] Japan .................................. 8-242753

[51] Int. Cl.[7] .............................. H04B 1/38; H04B 1/10; H04M 1/00
[52] U.S. Cl. ......................... 455/456; 455/565; 455/574; 455/521
[58] Field of Search ................................. 455/38, 3, 343, 455/421, 436, 563, 566, 517, 456, 574, 432, 410, 411, 457, 572, 88, 419, 420

[56] References Cited

U.S. PATENT DOCUMENTS

| | | | |
|---|---|---|---|
| 4,996,715 | 2/1991 | Marui et al. ............................. | 455/421 |
| 5,224,150 | 6/1993 | Neustein ................................ | 455/31.2 |
| 5,442,805 | 8/1995 | Sagers et al. ............................ | 455/456 |
| 5,548,800 | 8/1996 | Olds et al. . | |
| 5,604,730 | 2/1997 | Tiedemann, Jr. ....................... | 370/252 |
| 5,732,347 | 3/1998 | Bartle et al. ............................ | 455/421 |
| 5,737,707 | 4/1998 | Gaulke et al. .......................... | 455/572 |
| 5,819,170 | 10/1998 | Norimatsu .............................. | 455/572 |
| 5,940,764 | 8/1999 | Mikami .................................. | 455/456 |

FOREIGN PATENT DOCUMENTS 7-245782  9/1995  Japan .

*Primary Examiner*—Dwayne D. Bost
*Assistant Examiner*—Raymond B. Persino
*Attorney, Agent, or Firm*—Whitham, Curtis & Whitham

[57] ABSTRACT

A mobile communication system includes a base station having a message transmission function and installed near a place where the use of a mobile unit is restricted. When the mobile unit in a wait state enters an area under management of the base station, the base station transmits a data signal for reproducing a message for instructing the mobile unit to turn off a power supply for the mobile unit.

11 Claims, 4 Drawing Sheets

6,085,096

1

MOBILE COMMUNICATION SYSTEM

BACKGROUND OF THE INVENTION

1. Field of the Invention

The present invention relates to a mobile communication system and, more particularly, to a mobile communication system which restricts the use of mobile station radio units (to be referred to as mobile units hereinafter), which are used for mobile communication, in places where troubles may be caused by radio waves radiated from the mobile units or in places where speech communication through the mobile units makes the people around the mobile units uncomfortable.

2. Description of the Prior Art

Mobile communication is information communication performed by radio. Portable mobile units represented by portable telephones, pagers, and the like have recently become widespread because they allow communication at any time and in any place or during movement.

FIG. 1 is a block diagram showing the schematic arrangement of a conventional portable telephone 20.

The portable telephone 20 includes a transmission/reception antenna 21 for receiving a data signal from a base station and transmitting a data signal to the base station, a reception circuit 22 for amplifying the data signal received through the transmission/reception antenna 21, a demodulation circuit 23 for regenerating a clock by regenerating a baseband signal from the data signal amplified by the reception circuit 22, a speech decoding circuit 24 for converting the regenerated baseband signal into an analog speech signal and outputting it from a speaker 31, a speech encoding circuit 26 for converting an analog speech signal input from a microphone 32 into a baseband signal, a modulation circuit 27 for modulating the baseband signal into a transmission data signal in accordance with a certain modulation method, a transmission circuit 28 for amplifying the transmission data signal, a timing control circuit 25 for controlling the overall timing of the portable telephone 20, and a CPU 29 for controlling the overall operation of the portable telephone 20.

The operation of the portable telephone 20 will be described next.

When the power supply (not shown) for the portable telephone 20 is turned on, all the circuits are activated, a position registration signal for registering the position of the portable telephone 20 in the base station is transmitted from the transmission/reception antenna 21 to the base station through the modulation circuit 27 and the transmission circuit 28 under the control of the CPU 29. The portable telephone 20 is then set in the wait state. In the wait state, the operation mode of the portable telephone 20 is switched to the intermittent reception mode in which the supply of clocks from the timing control circuit 25 is, minimized, and the power supply for the reception circuit 22 and the demodulation circuit 23 is turned on only in time slots required for the reception of information from the base station. The speech decoding circuit 24, the speech encoding circuit 26, the modulation circuit 27, and the transmission circuit 28 are set in the standby state. In the intermittent reception mode, intermittent reception is performed several times in several hundred ms (milliseconds). When a terminating or originating operation is to be performed, the operation mode is switched to the speech communication mode.

In the speech communication mode, a data signal received from the base station through the transmission/reception antenna 21 is output as speech data from the speaker 31 through the reception circuit 22, the demodulation circuit 23, and the speech decoding circuit 24. Speech data input from the microphone 32 is converted into a data signal through the speech encoding circuit 26, the modulation circuit 27, and the transmission circuit 28 and is transmitted from the transmission/reception antenna 21 to the base station.

In the conventional mobile communication system, therefore, as long as the power supply for the mobile unit is turned on in a service area, communication can be performed in any place, i.e., a place where troubles may be caused by radio waves and a place where speech communication makes the people around the mobile unit uncomfortable.

It is said that radio waves radiated from mobile units such as portable telephones cause malfunctions in medical equipment, various types of instruments, and the like in hospitals, air planes, and the like. If, therefore, a user who knows nothing about this or a user who knows this information but forgets this enters a hospital or an air plane without turning off the power supply for the mobile unit, medical equipment, various types of instruments, and the like may malfunction.

In addition, since a mobile unit allows communication in public facilities, trains, and the like, communication sometimes makes the people around the mobile unit uncomfortable.

A system for forcibly making a mobile unit incapable of performing communication in places where the user of the use of the mobile unit needs to be inhibited, e.g., in trains, is disclosed in Japanese Unexamined Patent Publication No. 7-245782. According to the mobile communication system disclosed in Japanese Unexamined Patent Publication No. 7-245782, in places where the use of mobile units needs to be inhibited, the communication mode is switched to the pager mode to make the mobile unit incapable of performing communication, and at the same time, a terminating operation can be performed without making the people around the mobile unit uncomfortable. This system can only prevent speech communication from making the people around the mobile unit uncomfortable. This reference, however, gives no indication as to the problems caused by radio waves radiated from mobile units. This conventional system cannot prevent troubles caused by radio waves radiated from mobile units.

SUMMARY OF THE INVENTION

The present invention has been made in consideration of the above problem, and has as an object to provide a mobile communication system which can restrict the use of a mobile unit in places where troubles may be caused by radio waves radiated from mobile units and in places where speech communication makes the people around the mobile units uncomfortable.

In order to achieve the above and other objects, according to the first aspect of the present invention, there is provided a mobile communication system comprising a base station having a message transmission function and installed near a place where the use of a mobile unit is restricted, wherein when the mobile unit in a wait state enters an area under management of the base station, the base station transmits a data signal for reproducing a message for instructing the mobile unit to turn off a power supply for the mobile unit.

According to the mobile communication system of the first aspect, when the mobile unit enters an area near a place where the use of the mobile unit must be restricted, a warning message is directly presented from the mobile unit to the user. Therefore, the user can reliably turn off the power supply for the mobile unit.

According to the second aspect of the present invention, there is provided a mobile communication system comprising a base station having a message transmission function and installed near a place where the use of a mobile unit is restricted, wherein when the mobile unit in a wait state enters an area under management of the base station, the base station transmits a data signal for reproducing a message for interrupting speech communication and instructing a user of the mobile unit to turn off a power supply for the mobile unit, and also transmits a message for notifying the other party of incapability of speech communication.

According to the mobile communication system of the second aspect, when the mobile unit enters an area near a place where the use of the mobile unit must be restricted in a speech communication state, a warning message is directly presented from the mobile unit to the user. Therefore, the user can reliably turn off the power supply for the mobile unit. In addition, the other party can be notified of the reason why the speech communication is interrupted.

According to the third aspect of the present invention, there is provided a mobile communication system comprising a base station having a message transmission function and installed near a place where the use of a mobile unit is restricted, wherein when the mobile unit in a wait state enters an area under management of the base station, the base station transmits a power supply control signal to turn off a power supply for the mobile unit.

According to the mobile communication system of the third aspect, when the mobile unit enters an area near a place where the use of the mobile unit must be restricted, the power supply for the mobile unit is automatically turned off. Therefore, the use of the mobile unit can be inhibited more reliably.

As is obvious from the above description, according to the mobile communication system of the present invention, when the mobile unit enters a predetermined area, a warning message is directly presented to the user or the power supply for the mobile unit is forcibly turned off so as to reliably restrict the use of the mobile unit in places where troubles are caused by radio waves radiated from mobile units and places where speech communication through mobile units makes the people around the mobile units uncomfortable. Therefore, malfunctions in medical equipment, various types of instruments, and the like due to radio waves can be prevented. In addition, speech communication that makes the people around the mobile units uncomfortable can be prevented.

DETAILED DESCRIPTION OF THE PREFERRED EMBODIMENTS

Several preferred embodiments of the present invention will be described below with reference to the accompanying drawings.

Figure 2:
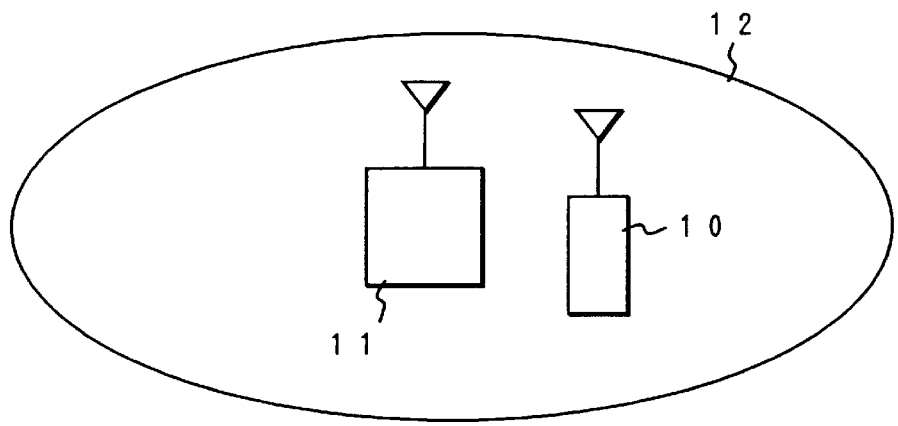
FIG. 2 is a block diagram showing the schematic arrangement of a mobile communication system according to the present invention.

FIG. 2 is a view showing the schematic arrangement of a mobile communication system according to the present invention.

In the first embodiment of the mobile communication system of the present invention, a base station 11 with a message transmission function is installed, in addition to a switching control station, base stations, and the like (none are shown) constituting the existing mobile communication system. The area covered by the base station 11 is shown as a cell 12. Note that FIG. 2 shows a state in which a mobile unit 10 enters the cell 12. In this embodiment, the mobile unit 10 is a portable telephone.

The base station 11 has an automatic message transmission function and a speech communication interruption function in addition to the function of a conventional base station. These functions will be described in detail later. Since the output level of the base station 11 is set to be lower than that of a conventional base station, the cell 12 under management of the base station 11 is smaller than the cell under management of the conventional base station.

A case in which the system of the first embodiment is applied to medical facilities will be described below. The base station 11 with the message transmission function is installed at the entrance or the like of a hospital, through which visitors pass without fail and at which no influence of radio waves is exerted on medical equipment.

Figure 3:
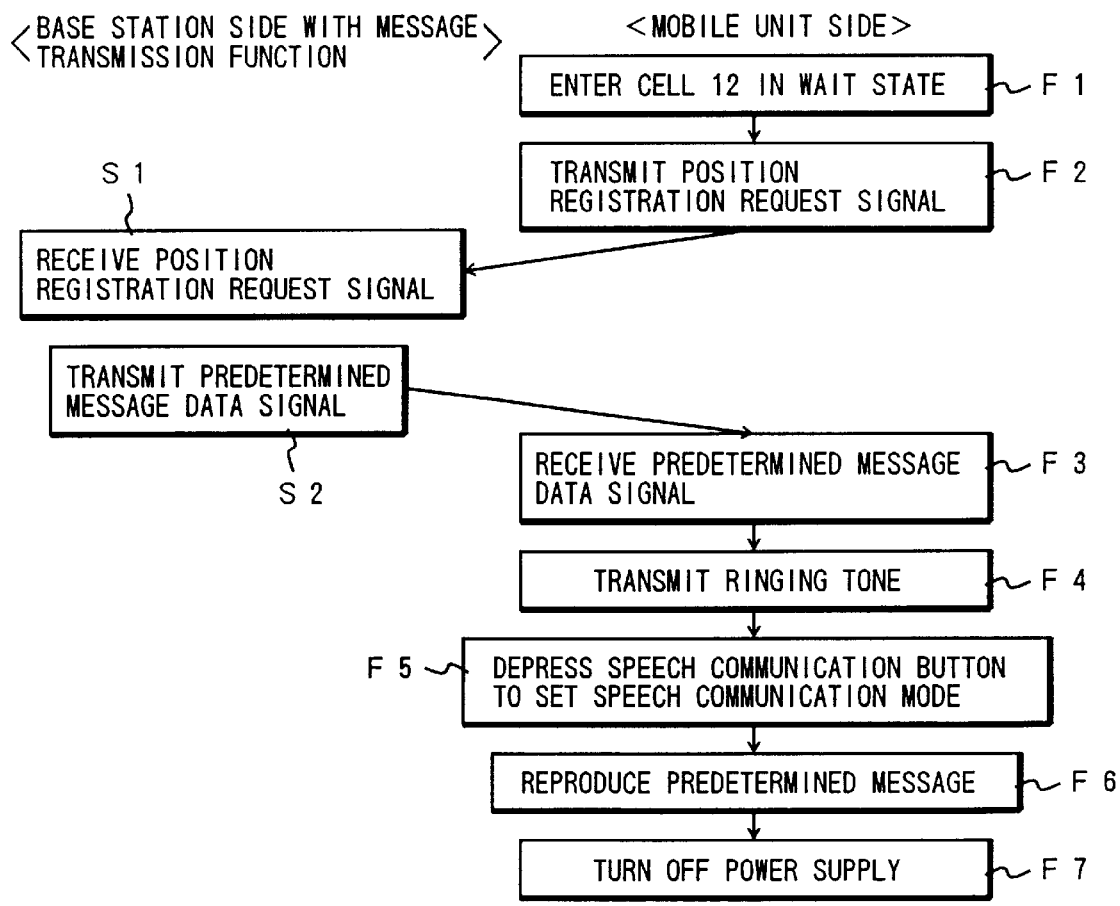
FIG. 3 is a flow chart showing the operation of the first embodiment of the present invention.

The operations of the base station 11 and the mobile unit 10 of the mobile communication system of the present invention will be described next with reference to FIG. 3. FIG. 3 is a flow chart showing the sequences of operations on both the base station 11 side and the mobile unit 10 side.

First of all, the mobile unit 10 enters the cell 12 under management of the base station 11 (step F1). The mobile unit 10 then transmits a position registration request signal to the base station 11 (step F2). Upon reception of the position registration request signal from the mobile unit 10, the base station 11 recognizes that the mobile unit 10 has entered the cell 12, and transmits a predetermined message data signal to the mobile unit 10 (steps S1 and S2).

Figure 4:
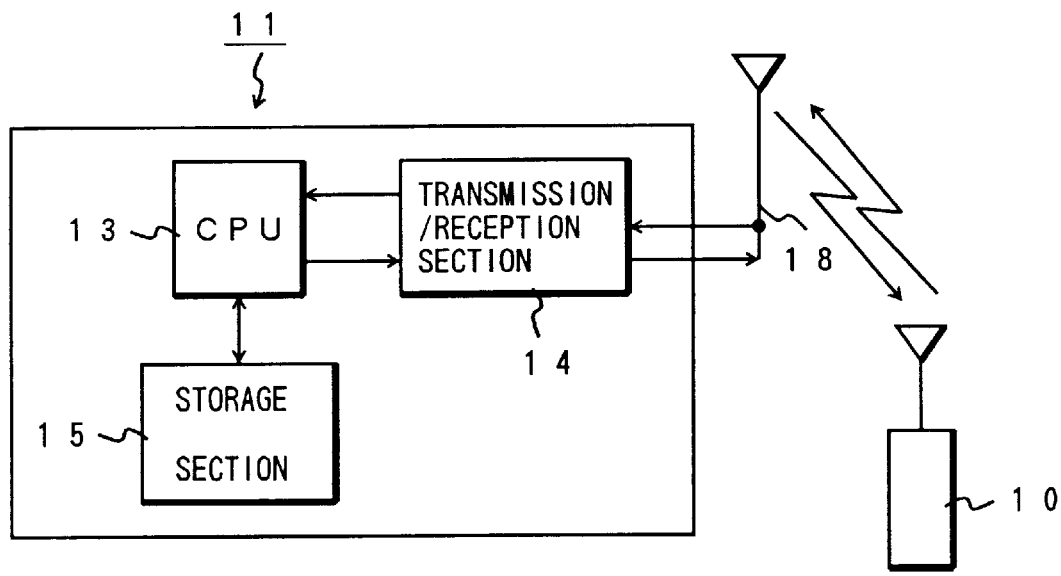
FIG. 4 is a block diagram showing the arrangement of the main part of a base station.

The operations in steps S1 and S2 on the base station 11 side will be described in more detail with reference to FIG. 4. FIG. 4 is a block diagram showing the main components of the base station 11.

The base station 11 is constituted by a transmission/reception section 14 including a transmission/reception multipleyer, an amplifier, a modem, a CPU 13 for controlling the overall operation of the base station 11, a storage section 15, and an antenna 18.

In step S1 in FIG. 2, when the base station 11 receives a position registration request signal from the mobile unit 10 through the antenna 18, the position registration request signal is sent to the CPU 13 through the transmission/reception section 14, and the CPU 13 recognizes the position registration request signal from the mobile unit 10. The CPU 13 then transmits predetermined message data stored in the storage section 15 in advance, as a predetermined message data signal, to the mobile unit 10 through the transmission/reception section 14.

Figure 1:
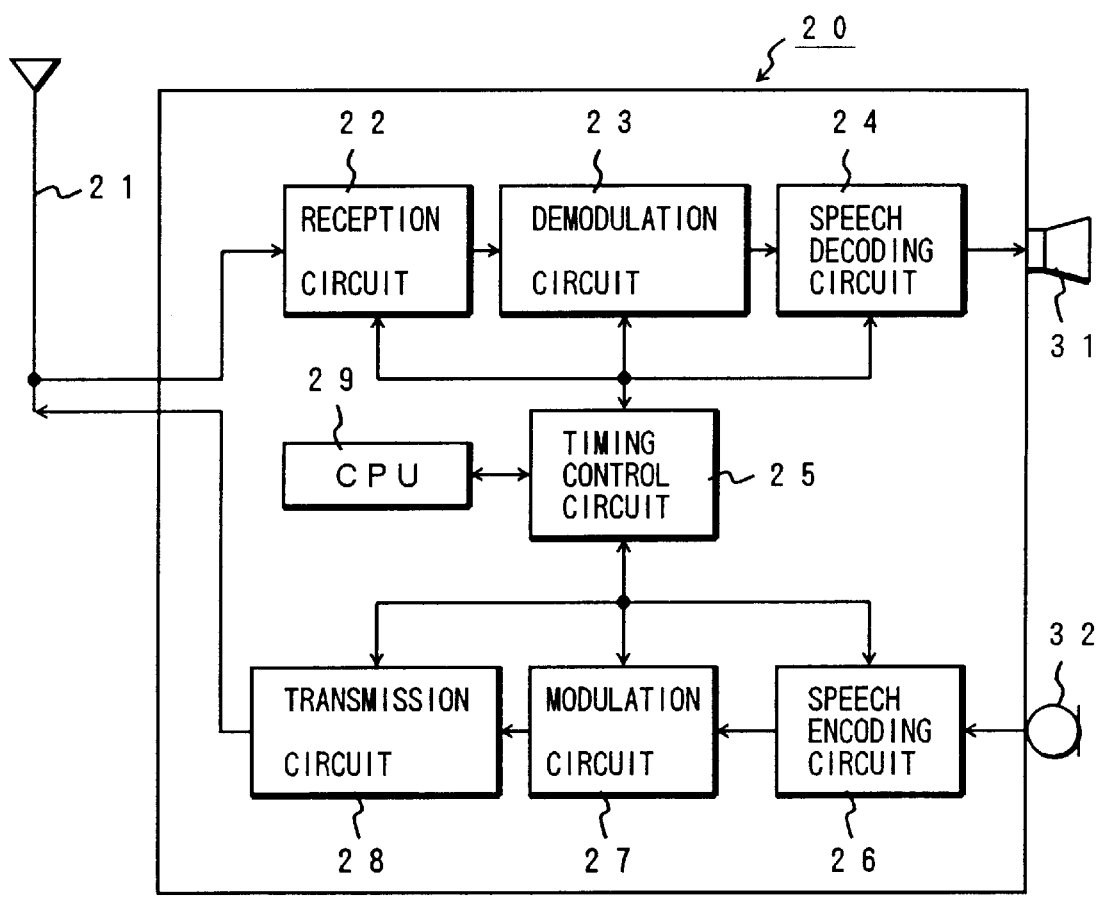
FIG. 1 is a block diagram showing the overall arrangement of a conventional mobile unit.
Figure 5:
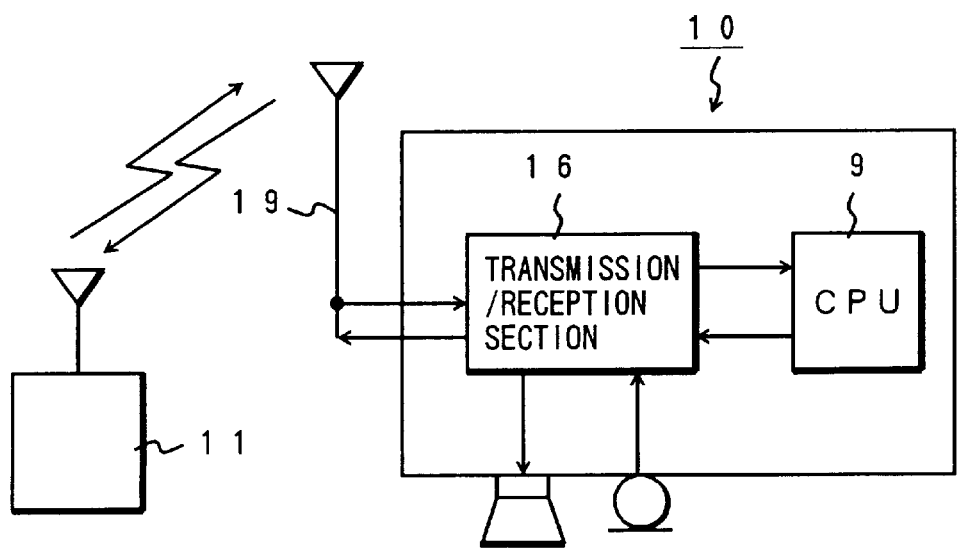
FIG. 5 is a block diagram showing the arrangement of the main part of a mobile unit.

The subsequent operations will be described next with reference to FIGS. 3 and 5. FIG. 5 is a block diagram showing the arrangement of the main part of the mobile unit 10. Although the arrangement of the mobile unit 10 is basically the same as that of the conventional mobile unit in FIG. 1, the transmission circuit, the reception circuit, the demodulation circuit, the modulation circuit, the speech decoding circuit, the speech encoding circuit, and the like are integrated into one unit, which is shown as a transmission/reception section 16. Reference numeral 19 denotes an antenna; and 9, a CPU for controlling the overall operation of the mobile unit 10.

Referring to FIG. 3, when the mobile unit 10 receives a predetermined message data signal from the base station 11, the CPU 9 in the mobile unit 10 recognizes the predetermined message data as an incoming call from the base station through the transmission/reception section 16, and notifies the user of the mobile unit 10 of the reception of the incoming call by, for example, generating a ringing tone from the speaker (steps F3 and F4).

Upon hearing the ringing tone, the user depresses the speech communication button (not shown) to set the speech communication mode (step F5). When the CPU 9 switches the operation mode of the mobile unit 10 from the wait state to the speech communication mode, the predetermined message data signal is output as speech from the speaker through the transmission/reception section 16 (step F6). For example, the contents of the predetermined message are "To prevent malfunction of medical equipment due to your portable telephone, please power off your portable telephone before entering". With this message, the user can turn off the power supply for the mobile unit 10 (step F7).

Figure 6:
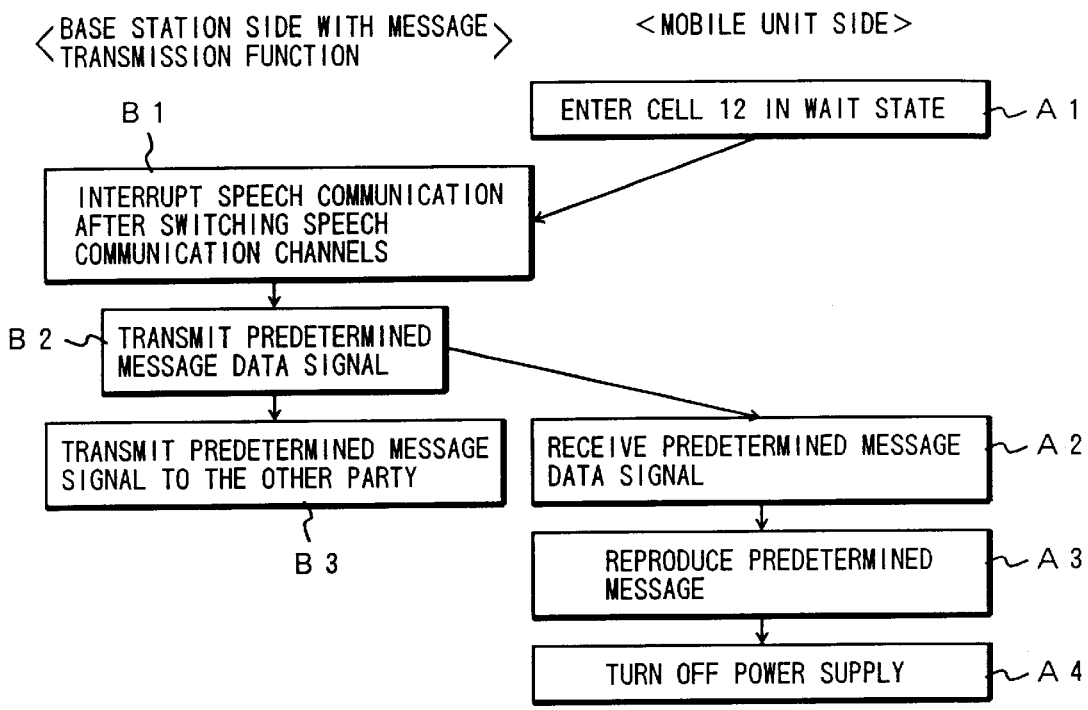
FIG. 6 is a flow chart showing the operation of the first embodiment.

The flow chart in FIG. 3 is associated with a case in which the mobile unit 10 in the wait state enters the cell 12. A case in which the mobile unit 10 enters the cell 12 while the user is performing speech communication in the speech communication mode will be described with reference to FIG. 6. FIG. 6 is a flow chart showing the sequences of operations to be performed on both the base station 11 side and the mobile unit 10 side when the mobile unit 10 enters the cell 12 while the user is performing speech communication.

First of all, the mobile unit 10 enters the cell 12 while the user is performing speech communication (step A1). When the mobile unit 10 moves from a radio zone in which the user has been performing speech communication to another radio zone, speech communication channel switching is performed through a switching control station or the like to continue the speech communication in a good communication state. In this embodiment, however, the base station 11 interrupts connection for speech communication with the mobile unit 10 after speech communication switching is performed (step B1). Subsequently, a predetermined message data signal is transmitted to the mobile unit 10 as in the case described with reference to FIG. 3 (step B2). With this operation, when the mobile unit 10 receives the predetermined message signal, the predetermined message is reproduced (steps A2 and A3), and the user can turn off the power. Meanwhile, predetermined message data is transmitted, through the switching control station, from the base station 11 to the person who is talking with the user of the mobile unit 10 (step B3). For example, the contents of the predetermined message transmitted to the remote station side are "The communication service is not available because the caller is in hospital".

Figure 7:
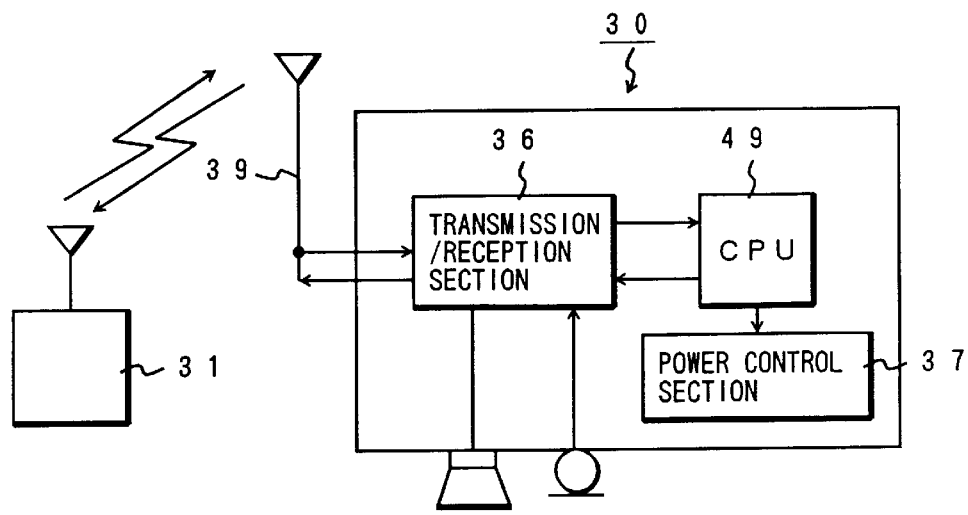
FIG. 7 is a block diagram showing the arrangement of the main part of a mobile unit according to the second embodiment of the present invention.

The second embodiment of the present invention will be described next with reference to FIG. 7.

A mobile communication system according to the second embodiment includes a base station 31 having a power supply control signal transmission function and designed to automatically transmit a power supply control signal to a mobile unit 30, and the mobile unit 30 for receiving the power supply control signal and turning off the power supply, in addition to a switching control station and base stations constituting the existing mobile communication system.

In the second embodiment, when the mobile unit 30 enters a cell under management of the base station 31 with the power supply control signal transmission function, and the base station 31 recognizes the entrance of the mobile unit 30 upon reception of a position registration request, the base station 31 transmits a power supply control signal to the mobile unit 30. When the mobile unit 30 receives the power supply control signal through an antenna 39 and a transmission/reception section 36, a power supply control instruction is notified to a CPU 49. In response to this instruction, the CPU 49 instructs a power supply control section 37 to turn off the power supply. As a result, the power supply for the mobile unit 30 is automatically turned off.

In the above embodiments described above, the present invention is applied to medical facilities. The base station with the message transmission function or the base station with the power supply control signal transmission function can be installed at a ticket gate in a stations, a bus stop, public facilities, a movie theater, the entrance of a concert hall, a gate in an airport, or the like. In addition, arbitrary messages can be set by rewriting predetermined messages and storing the new messages in the storage unit.

In the above embodiments described above, the mobile units are portable telephones. However, the mobile communication system of the present invention can also be applied to other types of mobile units.

What is claimed is:

1. A mobile communication system comprising:
   a base station having a message transmission function which is installed near a place where use of a mobile unit is restricted,
   wherein when the mobile unit in a wait state enters an area under management of said base station, said base station transmits a data signal for reproducing a message for instructing a user of the mobile unit to turn off a power supply for the mobile unit.

2. The system of claim 1, wherein said base station includes means for detecting when the mobile unit has entered the area of management of said base station.

3. The system of claim 2, wherein said area of management encompasses the place where use of the mobile unit is restricted.

4. A mobile communication system comprising:
   a base station having a message transmission function which is installed near a place where use of a mobile unit is restricted,
   wherein when the mobile unit in a speech communication mode enters an area under management of said base station, said base station transmits a data signal for reproducing a message for interrupting speech communication and instructing a user of the mobile unit to turn off a power supply for the mobile unit, and also transmits a message for notifying another party to said speech communication of incapability of speech communication.

5. The system of claim 4, wherein said base station includes means for detecting when the mobile unit has entered the area of management of said base station.

6. The system of claim 4, wherein said area of management encompasses the place where use of the mobile unit is restricted.

7. A mobile communication system comprising:

a base station having a message transmission function which is installed at an area where use of a mobile unit is restricted, said base station detecting when the mobile unit enters the restricted area, wherein when the base station detects that the mobile unit in a wait state has entered the restricted area, said base station transmits a power supply control signal to turn off a power supply for the mobile unit.

8. A mobile communications system comprising:

a mobile unit including:
(a) message transmission means,
(b) message receiving means, and
(c) processing means for controlling operation of said mobile unit;

a base station located at a restricted area including:
(a) means for transmitting a message, and
(b) monitoring means for monitoring the restricted area, wherein when the monitoring means of the base station detects that the mobile unit has entered the restricted area, said transmitting means in said base station transmits a control signal to said mobile station for turning off a power supply of the mobile unit.

9. The system of claim 8, wherein said control signal is a message instructing a user at the mobile unit to turn off a power supply of the mobile unit.

10. The system of claim 8, wherein said control signal is a power supply control signal which causes the processing means in said mobile unit to automatically turn off a power supply of the mobile unit.

11. The system of claim 8, wherein when said mobile unit enters said predetermined area during a time when said mobile unit is communicating with another unit, said base station transmits a message notifying a user at the other unit that communications with said mobile unit have been terminated.

* * * * *